(12) United States Patent
Park et al.

(10) Patent No.: US 9,941,539 B2
(45) Date of Patent: Apr. 10, 2018

(54) HIGHLY CONDUCTIVE POLYMER ELECTROLYTE MEMBRANE COMPRISING IONIC LIQUID

(71) Applicant: POSTECH ACADEMY-INDUSTRY FOUNDATION, Pohang-si (KR)

(72) Inventors: Moon Jeong Park, Pohang-si (KR); Onnuri Kim, Pohang-si (KR)

(73) Assignee: POSTECH ACADEMY-INDUSTRY FOUNDATION, Gyeongsangbuk-Do (KR)

( * ) Notice: Subject to any disclaimer, the term of this patent is extended or adjusted under 35 U.S.C. 154(b) by 61 days.

(21) Appl. No.: 14/434,541

(22) PCT Filed: Sep. 12, 2013

(86) PCT No.: PCT/KR2013/008260
§ 371 (c)(1),
(2) Date: Apr. 9, 2015

(87) PCT Pub. No.: WO2014/058159
PCT Pub. Date: Apr. 17, 2014

(65) Prior Publication Data
US 2015/0228887 A1    Aug. 13, 2015

(30) Foreign Application Priority Data

Oct. 10, 2012  (KR) .................. 10-2012-0112192
Jan. 18, 2013  (KR) .................. 10-2013-0006135

(51) Int. Cl.
*H01L 41/193* (2006.01)
*H01M 8/10* (2016.01)
(Continued)

(52) U.S. Cl.
CPC ......... *H01M 8/1048* (2013.01); *C08K 5/3445* (2013.01); *F03G 7/005* (2013.01);
(Continued)

(58) Field of Classification Search
CPC combination set(s) only.
See application file for complete search history.

(56) References Cited

U.S. PATENT DOCUMENTS

2006/0177716 A1*  8/2006  Saito .................. H01M 8/1016
                                                      429/188
2007/0166592 A1*  7/2007  Cho ....................... C08J 5/2231
                                                      429/493
(Continued)

FOREIGN PATENT DOCUMENTS

JP    2005-166598 A    6/2005
JP    2006-032181 A    2/2006
(Continued)

OTHER PUBLICATIONS

International Search Report for PCT/KR013/008260, dated Nov. 21, 2013 (Nov. 21, 2013), the whole document.

(Continued)

*Primary Examiner* — Kaity Chandler
(74) *Attorney, Agent, or Firm* — Steptoe & Johnson LLP

(57) ABSTRACT

The present invention relates to a highly conductive electrolyte comprising an ionic liquid and to a polymer electrolyte membrane using same, and more particularly, to a highly conductive polymer electrolyte membrane impregnated with a heterocyclic diazole-based ionic liquid and to a method for manufacturing same. The present invention relates to a polymer electrolyte thin film comprising an ionic liquid based on an imidazole compound represented by chemical formula (1), wherein R1 is an alkyl having a carbon number of 1 to 8 and R2 is hydrogen or an alkyl having a carbon number of 1 to 8:

(Continued)

Chemical Formula (1)

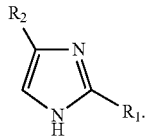

6 Claims, 7 Drawing Sheets

(51) Int. Cl.
*H01L 41/09* (2006.01)
*H01M 10/052* (2010.01)
*H01M 10/0565* (2010.01)
*H01M 8/1048* (2016.01)
*H01M 8/1023* (2016.01)
*H01M 8/1032* (2016.01)
*F03G 7/00* (2006.01)
*C08K 5/3445* (2006.01)
*H01M 8/1018* (2016.01)

(52) U.S. Cl.
CPC ....... *H01M 8/1023* (2013.01); *H01M 8/1032* (2013.01); *H01M 10/052* (2013.01); *H01M 10/0565* (2013.01); *H01M 2008/1095* (2013.01); *H01M 2300/0045* (2013.01); *H01M 2300/0082* (2013.01); *Y02P 70/56* (2015.11)

(56) References Cited

U.S. PATENT DOCUMENTS

| | | | | |
|---|---|---|---|---|
| 2009/0020730 | A1* | 1/2009 | Sugihara | C08L 65/00 252/500 |
| 2010/0165548 | A1* | 7/2010 | Sugihara | C07C 309/42 361/527 |
| 2010/0302714 | A1* | 12/2010 | Kobayakawa | C08L 65/00 361/529 |
| 2011/0053043 | A1* | 3/2011 | Balsara | B01D 69/02 429/493 |
| 2011/0059374 | A1* | 3/2011 | Kumita | H01M 8/16 429/401 |
| 2012/0018662 | A1* | 1/2012 | Sugihara | C08G 61/126 252/62.2 |
| 2012/0220446 | A1* | 8/2012 | Kishimoto | H01M 4/90 502/1 |
| 2017/0092984 | A1* | 3/2017 | Park | C08F 8/38 |

FOREIGN PATENT DOCUMENTS

KR  10-1119532 B1  2/2012
KR  10-2012-0032821 A  4/2012

OTHER PUBLICATIONS

Schneider et al. "Ionic Conduction in Nanostructured Membranes Based on Polymerized Protic Ionic Liquids", ACS Publications, 2013 American Chemical Society pp. 1543-1548.
Kim et al. "Proton Hopping and Diffusion Behavior of Sulfonated Block Copolymers Containing Ionic Liquids", ACS Publications, 2014 American Chemical Society pp. 1099-1108.

* cited by examiner

[Fig. 1]
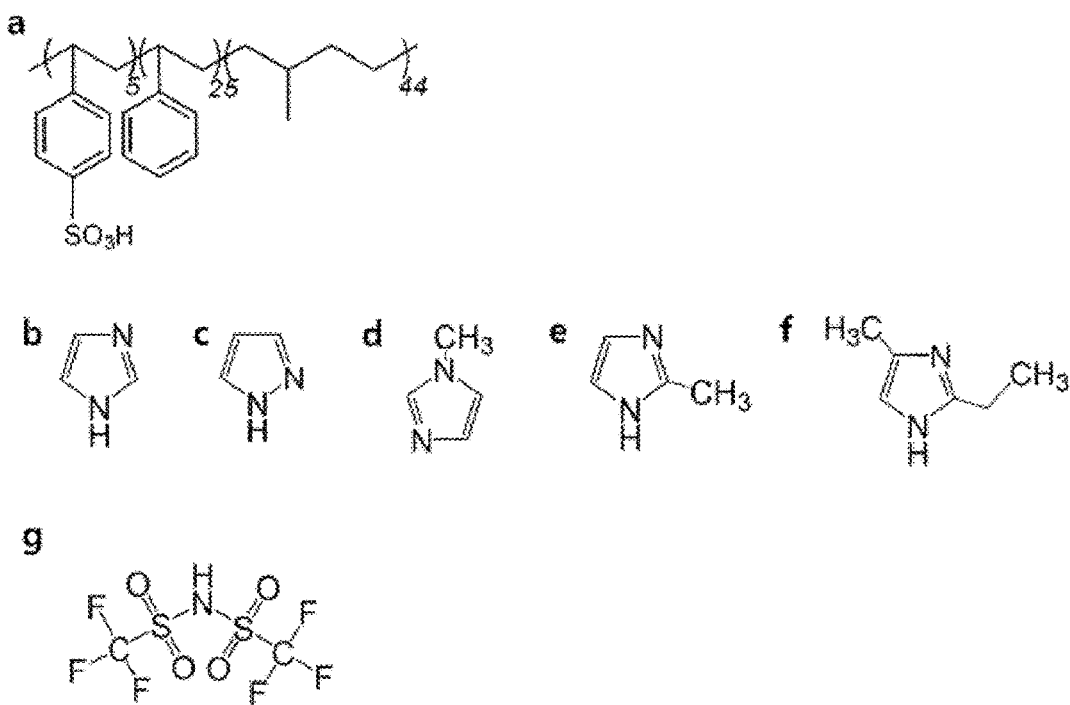

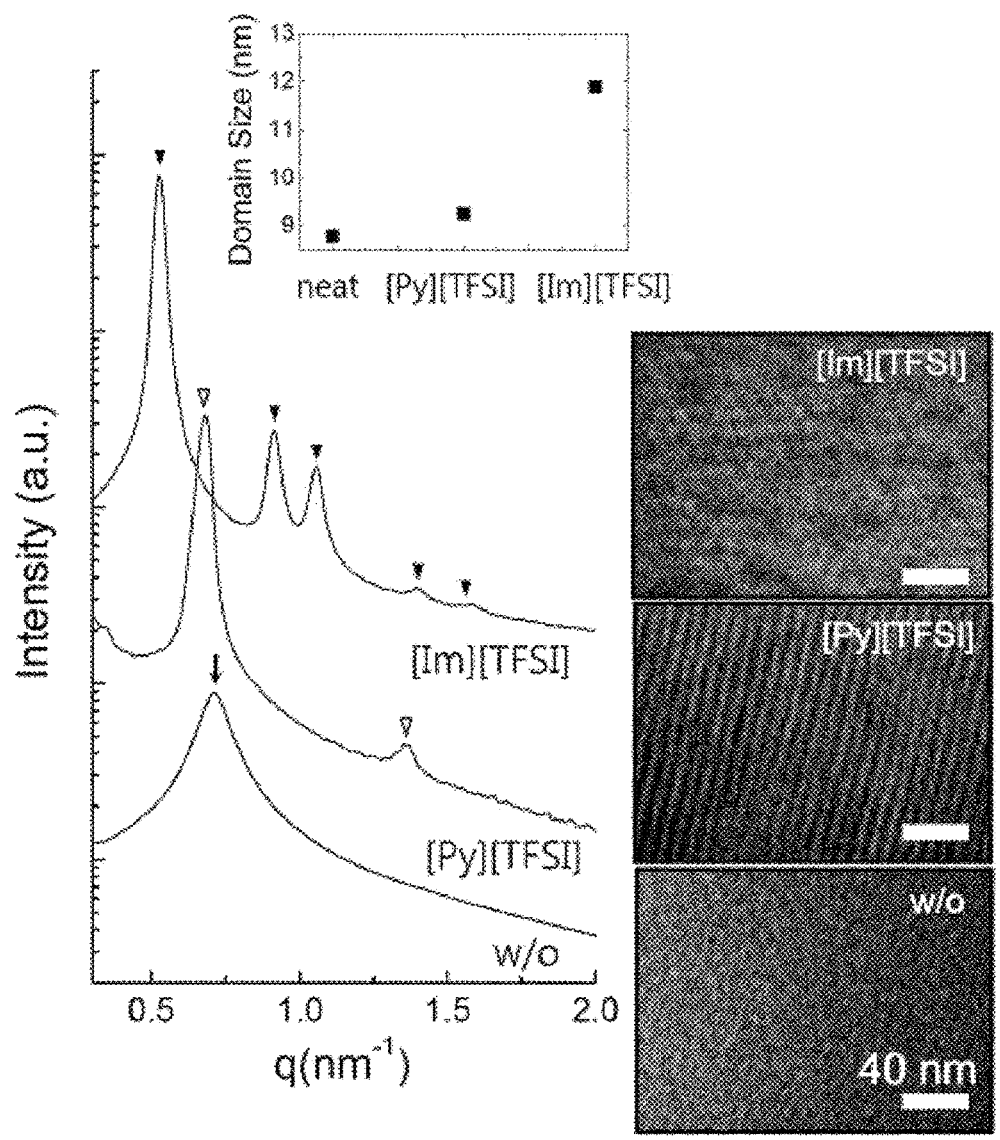
[Fig. 2]

[Fig. 3]
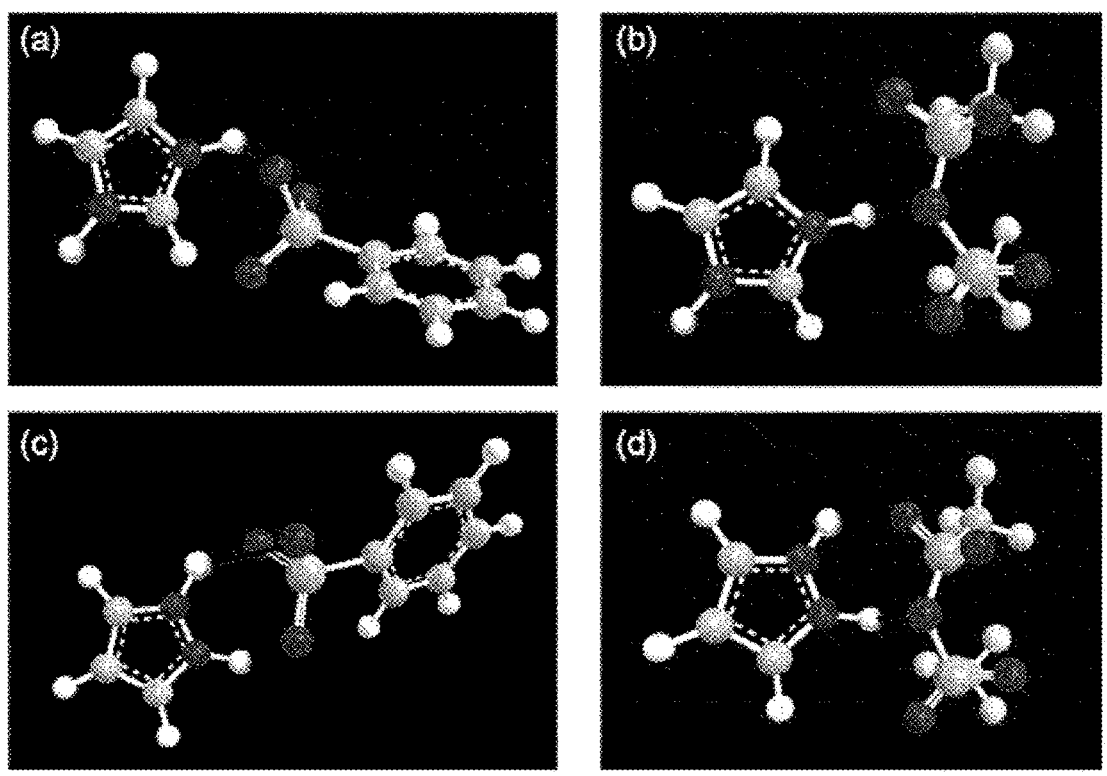

[Fig. 4]
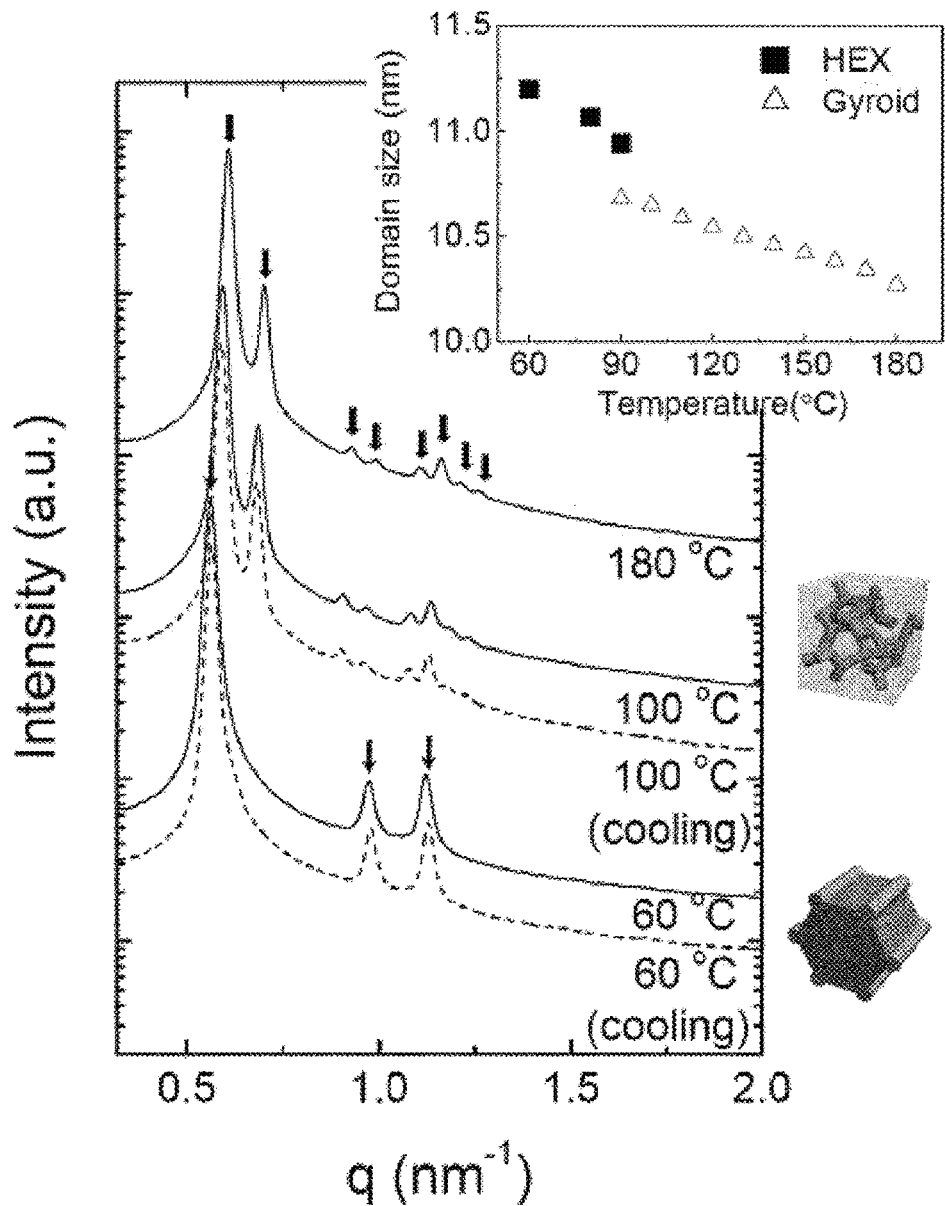

[Fig. 5]
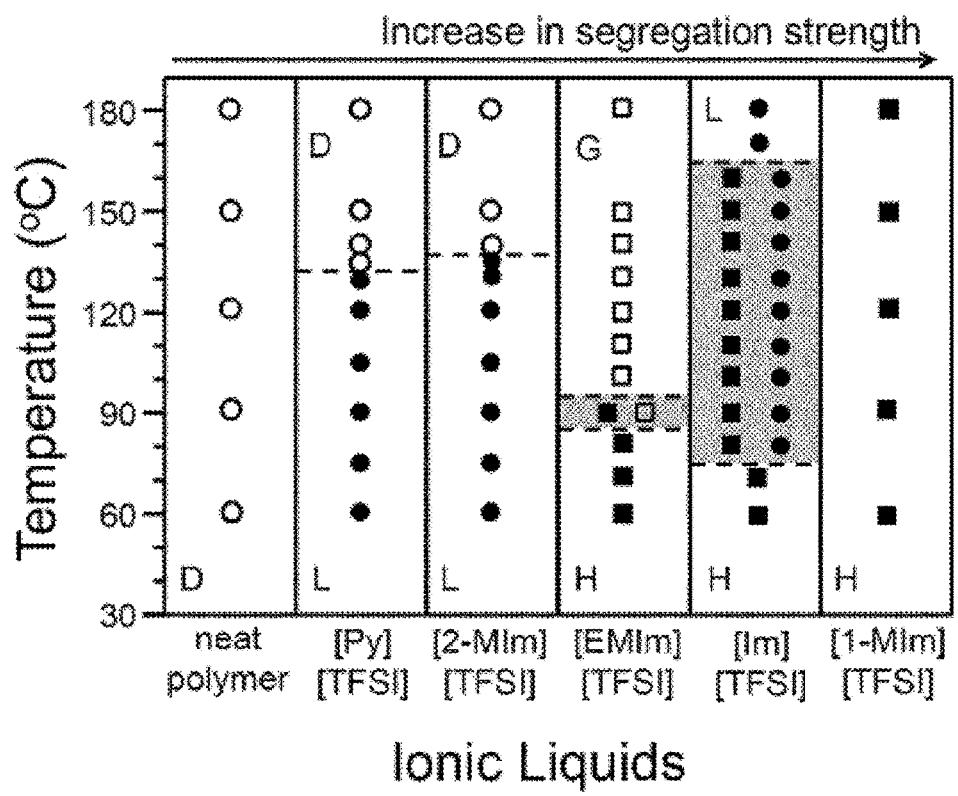

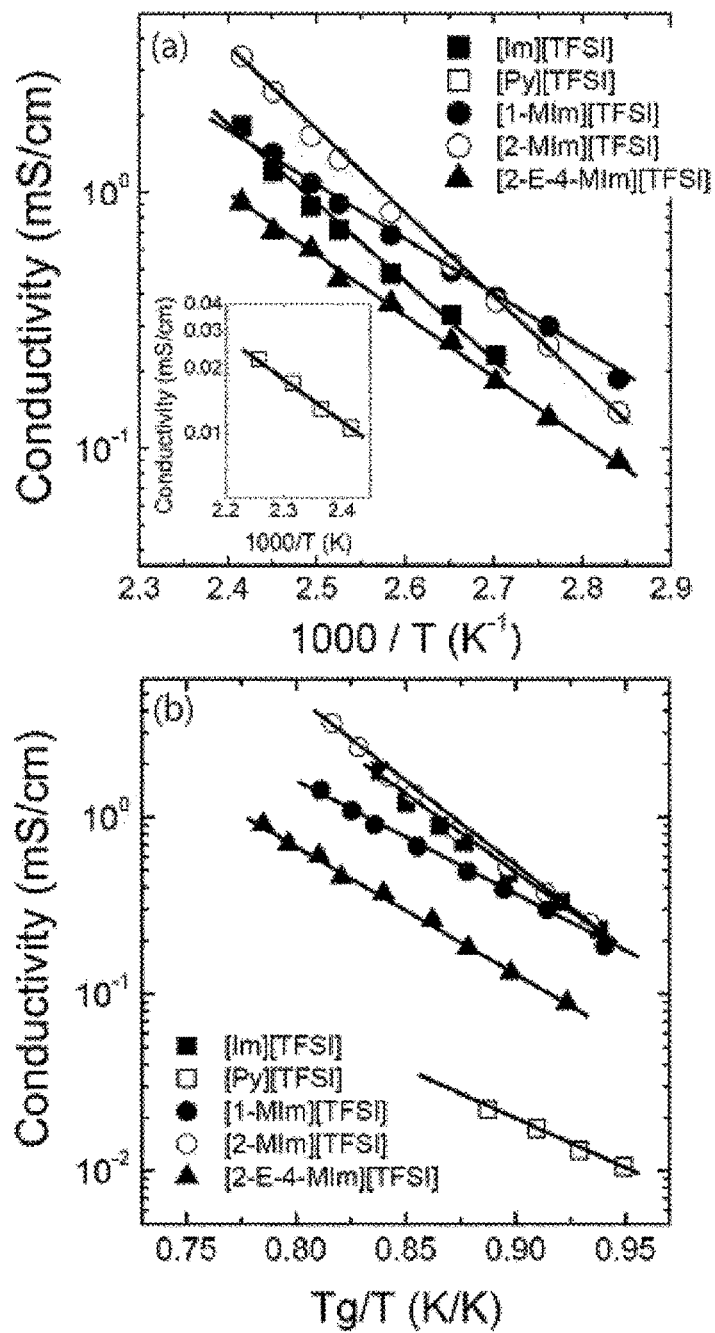
[Fig. 6]

[Fig. 7]
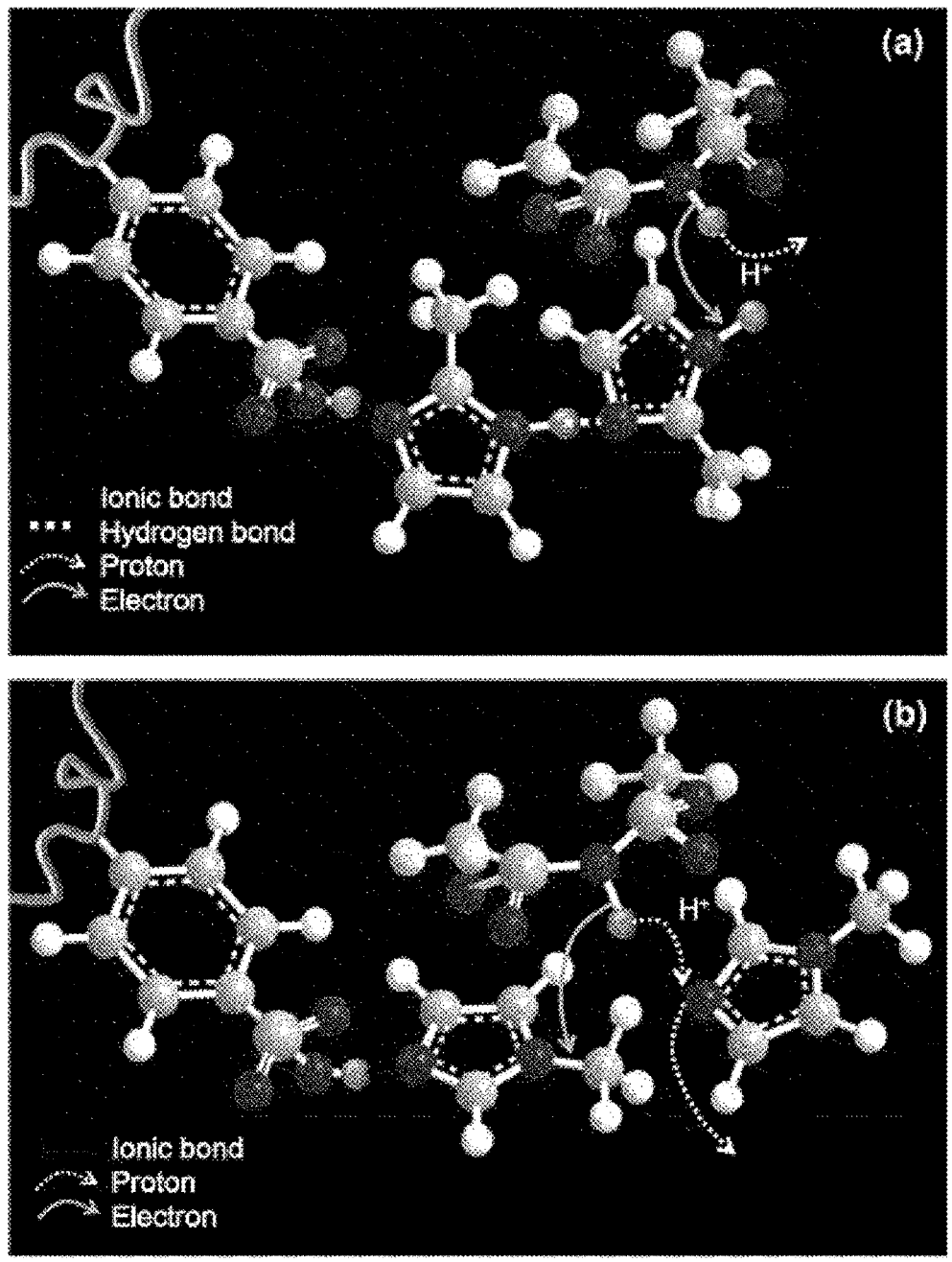

HIGHLY CONDUCTIVE POLYMER ELECTROLYTE MEMBRANE COMPRISING IONIC LIQUID

CLAIM FOR PRIORITY

This application claims priority under 35 USC 371 to International Application No. PCT/KR2013/008260, filed on Sep. 12, 2013, which claims priority to Korean Patent Application No. 10-2012-0112192, which was filed on Oct. 10, 2012, and Korean Patent Application No. 10-2013-0006135, which was filed on Jan. 18, 2013, each of which is hereby incorporated by reference in its entirety.

TECHNICAL FIELD

The present invention relates to a highly conductive electrolyte comprising an ionic liquid and a polymer electrolyte membrane using the same and, more particularly, to a highly conductive polymer electrolyte membrane impregnated with a heterocyclic diazole-based ionic liquid and a method of manufacturing the same.

BACKGROUND ART

Recently, great attention has been paid to ionic liquid-incorporated polymer electrolyte membranes (PEMs) for a variety of applications such as electroactive polymer actuators, lithium batteries, high-temperature fuel cells, etc. Thorough research thereto is ongoing as in the citation list described later.

Ionic liquids are organic salts, and have various physicochemical properties such as a low melting temperature, negligible vapor pressure, high thermal stability, electrochemical stability, etc. Because of such properties, ionic liquids are regarded as an alternative to volatile solvents that are typically used for high-temperature fuel cells.

Also, ionic liquids are advantageous because the degree of ion dissociation, local concentration of ions, and glass transition temperature of polymer electrolyte membranes may be changed when polymer electrolyte membranes are impregnated therewith, thus controlling the thermodynamic and electrochemical properties of polymer electrolyte membranes.

With the goal of enhancing performance of polymer electrolyte membranes, 1,3-alkylimidazole $[C_nIm, n=2\sim11]$-based ionic liquids have been utilized to date. Examples of the polymers for use in electrolyte membranes may include poly (vinylidene fluoride) (PVDF), poly (ethylene oxide) (PEO), poly(methyl methacrylate) (PMMA), poly(vinyl pyridine) (PVP), and poly (styrene sulfonate) (PSS).

Furthermore, methods developed to increase conductivity of the polymer membranes include increasing the local concentration of ions present in the conducting domain of the polymer, increasing the length of the alkyl chain in $[C_nIm]$ cations, altering the anion of ionic liquid, and enhancing the segregation between the ion conducting domain and the non-conducting domain in the polymer electrolyte membrane.

For example, Korean Patent No. 1119532, filed by the present inventors, discloses a method of increasing conductivity of a block copolymer including a sulfonated block using an ionic liquid composed of an anion containing a sulfur element and an imidazole-type cation.

However, the polymer electrolyte membranes impregnated with alkylimidazole $[C_nIm]$-based ionic liquids have insufficient protic sites where protons may be efficiently transported while being donated to or received from the $[C_nIm]$-based ionic liquids, making it difficult to enhance performance of the membranes.

CITATION LIST

1. Terasawa, N.; Ono, N.; Mukai, K.; Koga, T.; Higashi, N.; Asaka, K. Carbon, 2012, 50, 311-320.
2. Mukai, K.; Asaka, K.; Suigino, T.; Kiyohora, K.; Takeuchi, I.; Terasawa, N.; Futaba. D. N.; Hata, K.; Fukushima, T.; Aida, T. Adv. Mater. 2009, 21, 1582-1585.
3. Imaizumi, S.; Kokubo, H.; Watanabe, M. Macromolecules, 2008, 8(1), 265-270.
4. Seki, S.; Ohno, Y.; Kobayashi, Y.; Miyashiro, H.; Usami, A.; Mita, Y.; Tokuda, H.; Watanabe, M.; Hayamizu, K.; Tsuzuki, S. J. Electrochem. Soc. 2007, 154(3), A173-A177.
5. Kim, G. T.; Jeong, S. S.; Xue, M. Z.; Balducci, A.; Winter, M.; Passerini, S.; Alessandrini, F.; Appetecchi, G. B. J. Power Sources 2012, 199, 239-246.
6. Choi, I.; Ahn, H.; Park, M. J. Macromolecules, 2011, 44 (18), 7327-7334.
7. Steininger, H.; Schuster, M.; Kreuer, K. D.; Kaltbeitzel, A.; Bingol, B.; Meyer, W. H.; Schauff, S.; Brunklaus, G.; Maier, J.; Spiess, H. W. Phys. Chem. Chem. Phys., 2007, 9, 1764-1773.
8. Tang, Q.; Wu, J.; Tang, Z.; Li, Y.; Lin, J. J. Mater. Chem., 2012, 22, 15836-15844.
9. Kim, S. Y.; Kim, S.; Park, M. J.; Nat. Commun., 2010, 1:88.
10. Mistry, M. K.; Subianto, S.; Choudhury, N. R.; Dutta, N. K. Langmuir, 2009, 25, 9240-9251.
11. Ohno, H. In Electrochemical Aspects of Ionic Liquids, John Wiley & Sons, Inc.; Hoboken, N.J., USA, 2005.
12. Armand, M.; Endres, F.; MacFarlane, D. R.; Ohno, H.; Scrosati, B. Nat. Mater., 2009, 8, 621-629.
13. Sowmiah, S.; Srinivasadesikan, V.; Tseng, M. C.; Chu, Y. H. Molecules 2009, 14, 3780-3813.
14. Green, M. D.; Long, T. E. Polym. Rev. 2009, 49, 291-314.
15. Hou, J.; Zhang, Z.; Madsen, L. A. J. Phys. Chem. B 2011, 115, 4576-4582.
16. Lalia, B. S.; Yamada, K.; Hundal, M. S.; Park, J. J.; Park, G. G.; Lee, W. Y.; Kim, C. S.; Sekhon, S. S. Appl. Phys. A: Mater. Sci. Process. 2009, 96, 661-670
17. Green, M. D.; Salas-de la Cruz, D.; Ye, Y.; Layman, J. M.; Elabd, Y. A.; Winey, K. I.; Long, T. E.; Macromol. Chem. Phys. 2011, 212, 2522-2528.
18. Ye, Y.; Elabd, Y. A. Polymer 2011, 52(5), 1309-1317.
19. Fernicola, A.; Panero, S.; Scrosati, B. J. Power Sources 2008, 178, 591-595
20. Cho, E. K.; Park, J. S.; Sekhon, S. S.; Park, G. G.; Yang, T. H.; Lee, W. Y.; Kim, C. S.; Park, S. B. J. Electrochem. Soc. 2009, 156, B197-B202.
21. Lee, H. N.; Newel, N.; Bai, Z.; Lodge, T. P. Macromolecules, 2012, 45 (8), 3627-3633
22. Gwee, L.; Choi, J. H.; Winey, K. I.; Elabd, Y. A. Polymer, 2010, 51(23), 5516-5524.
23. Susan, M. A. B. H.; Kaneko, T.; Noda, A.; Watanabe, M. J. Am. Chem. Soc. 2005, 127, 4976-4983.
24. Hoarfrost, M. L.; Tyagi, M. S.; Segalman, R. A.; Reimer, J. A. Macromolecules 2012, 45, 3112-3120.
25. Virgili, J. M.; Hexemer, A.; Pople, J. A.; Balsara, N. P.; Segalman, R. A. Macromolecules 2009, 42, 4604-4613.
26. Kim, S. Y.; Yoon, E.; Joo, T.; Park, M. J. Macromolecules 2011, 44, 5289-5298

27. Chen, L.; Hallinan, D. T.; Elabd, Y. A.; Hillmyer, M. A. *Macromolecules* 2009, 42(16), 6075-6085.
28. Elabd, Y, A.; Hickner, M. A. *Macromolecules*, 2011, 44(1), 1-11.
29. Missan, H. P. S.; Lalia, B. S.; Karan, K.; Maxwell, A. *Mater. Sci. Eng., B* 2010, 175, 143-149.
30. Du, Q.; Fu, X.; Liu, S.; Niu, L. *Polym Int.* 2012, 61, 222-227.
31. Choi, U. H.; Lee, M.; Wang, S.; Liu, W.; Winey, K. I.; Gibson, H. W.; Colby, R. H. *Macromolecules* 2012, 45, 3974-3985.
32. Lee, M.; Choi, U. H.; Cruz, D. S.; Mittal, A.; Winey, K. I.; Colby, R. H.; Gibson, H, W. *Adv. Funct. Mater.* 2011, 21, 708-717.
33. Liu, Y.; Liu, S.; Lin, J.; Wang, D; Jain, V.; Montazami, R.; Heflin, J. R.; Li, J.; Madsen, L.; Zhang, Q. M. *Appl. Phys. Lett.* 2010, 96, 223503.
34. Kreuer, K. D. Paddison, S. J.; Spohr, E.; Schuster, M. *Chem. Rev.* 2004, 104, 4637-4678.
35. Salas-de la Cruz, D.; Green, M. D.; Ye, Y.; Elabd, Y. A.; Long, T. E.; Winey, K. I. *J. Polymer Science, Part B: Polymer Physics* 2012, 50(16), 338-346.
36. Mangiatordi, G. F.; Hermet, J.; Adamo, C. J. *Phys. Chem. A,* 2011, 115(12), 2627-2634.
37. Endo, T.; Kato, T.; Nishikawa, K. *J. Phys. Chem. B,* 2010, 114 (28), 9201-9208.
38. Schuster, M. F. H.; Meyer, W. H.; Schuster, M.; Kreuer, K. D. *Chem. Mater.* 2004, 16, 329-337.
39. Kreuer, K. D.; Fuchs, A.; Ise, M.; Spaeth, M.; Maier, J. *Electrochem. Acta* 1998, 43(10-11), 1281-1288.
40. Lenarcik B.; Ojczenasz. P.; *J. Heterocyclic Chem.,* 2002, 39, 287-290.
41. S. U.; Bozkurt, A.; Hosseini, S. S. *Prog. Polym. Sci.* 2012, 37, 1265-1291.
42. Miran M. S.; Kinoshita H.; Yasuda T.; Susan M. A. B. H.; Watanabe M.; *Phys. Chem Chem. Phys.,* 2012, 14, 5178-5186.
43. Hanley, K. J.; Lodge, T. P.; Huang, C.-I. *Macromolecules,* 2000, 33(16), 5918-5931.
44. Stephens, P. J.; Devlin, F. J.; Chabalowski, C. F.; Frisch, M. J. *J. Phys. Chem.* 1994, 98, 11623-11627.
45. Alexandridis, P.; Olsson, U.; Lindman, B. *Langmuir,* 1998, 14(10), 2627-2638.
46. Vogel, H. *Phys. Z.* 1921, 22, 645.
47. Wanakule, N.; Panday, A.; Mullin, S. A.; Gann, E.; Hexemer, A.; Balsara, N. P. *Macromolecules* 2009, 42, 5642-5651.
48. Sax, J.; Ottino, J. M. *Polym. Eng. Sci.* 1983, 23 (3), 165-176.

DISCLOSURE

Technical Problem

Accordingly, an object of the present invention is to provide a novel ionic liquid, which is incorporated in a polymer electrolyte membrane so as to enhance conductivity of the polymer electrolyte membrane.

Another object of the present invention is to provide a highly conductive polymer electrolyte membrane comprising a heterocyclic diazole-based ionic liquid having a large number of protic sites compared to a [C$_n$Im]-based ionic liquid.

Still another object of the present invention is to provide an electroactive polymer actuator, a lithium battery, and a high-temperature fuel cell, including the highly conductive polymer electrolyte comprising the heterocyclic diazole-based ionic liquid.

Technical Solution

In order to accomplish the above objects, the present invention provides a polymer electrolyte membrane comprising an ionic liquid based on an imidazole compound represented by Chemical Formula (1) below:

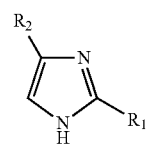

Chemical Formula (1)

wherein R1 is C1-C8 alkyl, and preferably methyl, and R2 is hydrogen or C1-C8 alkyl, and preferably hydrogen.

In the present invention, the imidazole compound of Chemical Formula (1) is 2-alkylimidazole having two protic sites and able to decrease the glass transition temperature of a polymer membrane. Particularly useful is 2-methylimidazole having a short alkyl length so as to be favorable for ion transport.

As used herein, the term '-based' or 'based on' means that the imidazole compound is ionized to constitute an ionic liquid together with the anion resulting from an anion compound.

As used herein, the anion compound refers to a compound that is ionized to form an anion.

In the present invention, the anion, which constitutes an ionic liquid together with the imidazole compound, may include typical anions, and preferably an anion containing a sulfur atom. Examples thereof may include CH3SO3-, CF3SO3-, (CF3SO2)2N—, (CF3SO2)3C—, and N(SO2CF3)2-.

In the present invention, the polymer may be a conductive polymer having ionic conductivity, and is preferably a self-assembled block copolymer that may be ordered variously depending on the ionic liquid or the temperature so as to possess high ionic conductivity.

In an embodiment of the present invention, the self-assembled block copolymer may be a block copolymer having a styrene block, at least a portion of which is sulfonated. Preferably useful is a block copolymer having a styrene repeating unit and an alkylene repeating unit. For example, useful is a poly(styrenesulfonate-b-methylbutylene) (PSS-b-PMB) block copolymer in which the sulfonation level of the styrene block is controlled to 5~90 mol %, and preferably 10~50 mol %.

For instance, when a low molecular weight PSS-b-PMB copolymer (3.5-3.1 kg/mol) with a sulfonation level of 17 mol % includes a heterocyclic diazole-based ionic liquid, it has a disordered structure at room temperature, but the addition of various ionic liquids results in different ordered nanostructures, for example, a lamellar (LAM) structure, a hexagonal cylinder (HEX) structure, and a gyroid (GYR) structure. Also, the nanostructure at room temperature of the ionic liquid-incorporated PSS-b-PMB copolymer membrane may vary depending on changes in the temperature. Preferably, when a gyroid structure where ionic channels are interconnected is formed, high standard conductivity may result.

In addition, the present invention provides an electroactive polymer actuator, a lithium battery, or a high-temperature fuel cell, using the polymer electrolyte impregnated with the imidazole compound-based ionic liquid.

In addition, the present invention provides a method of forming a variety of ordered nanostructures by adding the sulfonated block copolymer with heterocyclic diazole-based ionic liquids having various structures.

In addition, the present invention provides a polymer electrolyte comprising a sulfonated block copolymer and a heterocyclic diazole-based ionic liquid, where the sulfonated block copolymer has a predetermined ordered structure depending on the heterocyclic diazole-based ionic liquid.

In an embodiment of the present invention, when a block copolymer is added with [Im][HTFSI], a HEX structure is formed. The addition of [Py][HTFSI] or [2-MIm][HTFSI] may lead to a LAM structure, and the addition of [1-MIm][HTFSI] generates no structural change.

In the present invention, the sulfonated block copolymer may be represented by Chemical Formula (2) below, wherein R1 to R4 are independently hydrogen, C1-C20 alkyl, C2-C20 alkenyl, or C6-C20 aryl; a is 5 to 500, and b is 5 to 700; and n is 0.01 to 1, and x is 0 to 0.99.

Chemical Formula (2)

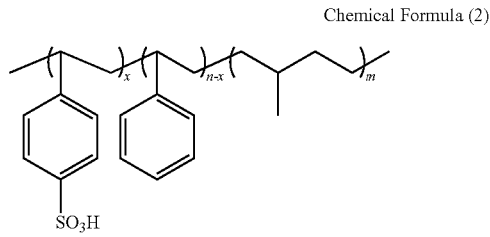

Advantageous Effects

According to the present invention, a highly conductive polymer electrolyte membrane can be provided, and has a variety of nanostructures depending on the ionic liquid.

DESCRIPTION OF DRAWINGS

FIG. 1 illustrates the structural formulas of (a) poly(styrenesulfonate-b-methylbutylene) [$S_{30}MB_{44}$ (17) copolymer], (b) imidazole [Im], (c) pyrazole [Py], (d) 1-methylimidazole [1-MIm], (e) 2-methylimidazole [2-MIm], (f) 2-ethyl-4-methylimidazole [2-E-4-MIm], and (f) bis(trifluoromethane)sulfonimide [HTFSI];

FIG. 2 illustrates SAXS profiles of [Im][HTFSI]- and [Py][HTFSI]-incorporated $S_{30}MB_{44}$ (17) copolymers at room temperature, as compared with that of a neat $S_{30}MB_{44}$ (17) copolymer, in which the right images are cross-sectional TEM images, sequentially showing HEX, LAM, and disorder structures (downwards), and the upper graph shows a domain size;

FIG. 3 illustrates the molecular schemes for ionic bond formation of [Im] and [Py] in the presence of a sulfonic acid group and TFSI ions, showing (a) [Im][—$SO_3H$], (b) [Im][HTFSI], (c) [Py][—$SO_3H$], and (d) [Py][HTFSI];

FIG. 4 illustrates SAXS data of a [2-E-4-MIm][HTFSI]-incorporated $S_{30}MB_{44}$ (17) copolymer depending on the temperature, where the inset graph shows the domain size of the morphology depending on the temperature;

FIG. 5 illustrates phase diagrams of $S_{30}MB_{44}$ (17) copolymers depending on the heterocyclic diazole-based ionic liquid;

FIG. 6 illustrates (a) the temperature-dependent through-plane conductivity of ionic liquid-incorporated $S_{30}MB_{44}$ (17) copolymers, and (b) the normalized conductivity of the membranes on the basis of Tg;

FIG. 7 illustrates (a) the ion transport mechanism in a [2-MIm][HTFSI]-incorporated $S_{30}MB_{44}$ (17) copolymer, and (b) the ion transport mechanism in a [1-MIm][HTFSI]-incorporated $S_{30}MB_{44}$ (17) copolymer; and

BEST MODE

A better understanding of the present invention may be obtained via the following examples that are set forth to illustrate, but are not to be construed as limiting the present invention.

EXAMPLE

Synthesis of PSS-b-PMB Copolymer

A low molecular weight poly(styrene-b-methylbutylene) (PS-b-PMB) copolymer (3.1-3.1 kg/mol) was synthesized by sequential anionic polymerization of styrene and isoprene and then selective hydrogenation of polyisoprene. The polydispersity index of the hydrogenated polymer was 1.03, and the molecular weight and the molecular weight distribution of the PS-b-PMB copolymer were analyzed with nuclear magnetic resonance spectroscopy ($^1$H-NMR, Bruker AVB-300) and gel permeation chromatography (GPC, Waters Breeze 2 HPLC). Then, the styrene block of the PS-b-PMB copolymer was sulfonated. The sulfonation level is calculated into 17 mol % by the ratio of the moles of sulfonated styrene (after the sulfonation) relative to the total moles of styrene (before the sulfonation). The PSS-b-PMB copolymer (3.5-3.1 kg/mol) thus obtained is seen in FIG. 1a.

Ionic Liquids (ILs)

Imidazole ([Im], ≥99.5%), pyrazole ([Py], ≥98.0%), 1-methylimidazole ([1-MIm], ≥99.0%), 2-methylimidazole ([2-MIm], ≥99.0%), 2-ethyl-4-methylimidazole ([2-E-4-MIm], ≥95.0%), and bis(trifluoromethane)sulfonimide ([HTFSI], ≥95%) were purchased from Sigma Aldrich. The chemical structures thereof are illustrated in FIGS. 1b to 1g. Five nonstoichiometric ionic liquids were synthesized by mixing heterocyclic diazoles and HTFSI at a molar ratio of 2:1 at 180° C.

The composition of the nonstoichiometric ionic liquids thus synthesized was determined by differential scanning calorimetry (DSC) and $^1$H-NMR. The properties of individual diazoles and HTFSI are shown in Table 1 below.

Formation of Ionic Liquid-Incorporated PSS-b-PMB Membranes

Inhibitor-free anhydrous tetrahydrofuran (THF, ≥99.9%) was used without further purification, and methanol was used after two degassing procedures. The PSS-b-PMB copolymer was added with an ionic liquid in the equimolar amount to the mole of sulfonic acid [—$SO_3H$], after which 5 wt % solutions were prepared using mixed solvents of THF and methanol at 50:50 vol %.

These solutions were stirred overnight at room temperature, and then subjected to solvent casting for two days in an argon atmosphere, giving membranes having a thickness of 80~120 µm, which were then dried in a vacuum at 70° C. for one week. To exclude the contact of hygroscopic samples to water, sample preparation and various measurement tests were carried out in a glove box in an argon atmosphere with oxygen and moisture concentrations of 0.1 ppm or less.

Measurement

The manufactured thin films were analyzed with small angle X-ray scattering, transmission electron microscopy, conductivity measurement, and DSC. Individual analysis methods are described below.

Small Angle X-Ray Scattering (SAXS)

The ionic liquid-incorporated membranes were placed in an airtight sample cell (consisting of an aluminum spacer, two Kapton windows, O-rings, and aluminum covers). SAXS testing was performed using 4C beam line at the Pohang Light Source (PLS). Sample temperature was controlled within ±0.2° C. using a sample stage provided by the PLS. The wavelength of the incident X-ray beam was 0.15 nm ($\Delta\lambda/\lambda=10^{-4}$), and the distance between the sample and the detector was set to 1.5 m, and thereby the range of the resulting scattering wave vector q ($q=4\pi \sin(\theta/2)/\lambda$, $\theta$=scattering angle) was determined in the range of 0.1~2.0 $nm^{-1}$.

Transmission Electron Microscopy (TEM)

The ionic liquid-incorporated PSS-b-PMB membranes were cryo-microtomed at −120° C. using a RMC Boeckeler PT XL Ultramicrotome machine to obtain thin sections having a thickness of 80~120 nm. The electron contrast in samples was enhanced by exposure to ruthenium tetroxide (RuO4) vapor for 50 min. The stained samples were observed using a JEOL JEM-2100F microscope operating at 200 kV equipped with a stage at −160° C. and an Omega energy filter. The images thereof were obtained using a Gatan 2048×2048 pixel CCD camera (Gatan Inc., Pleasanton, Calif.) and Digital Micrograph (Gatan, Inc.) software.

Measurement of Conductivity

The conductivity of ionic liquid-incorporated PSS-b-PMB membranes was measured using AC impedance spectroscopy in a glove box. Using an electrode cell (consisting of 1.25 cm×1.25 cm stainless steel blocking electrodes, Kapton spacers, and 1 cm×1 cm platinum plates) made in lab, through-plane conductivity was measured as below. Specifically, a blocking electrode having a 0.8 cm×0.8 cm sized hole was prepared, and the sample (0.8 cm×0.8 cm, 500 μm thick) was placed in the hole. The Kapton spacers drilled so as to be adapted for the size of the hole were attached to the upper and lower sides of the blocking electrode, and the resulting blocking electrode was sandwiched between two platinum plates, to which current was then allowed to flow to measure conductivity. As such, the platinum plates function as working and counter electrodes. Data was recorded by a 1260 Solatron impedance analyzer operating in the frequency range of 1~100,000 Hz.

Differential Scanning Calorimetry (DSC)

The glass transition temperature (Tg) of ionic liquid-incorporated PSS-b-PMB membranes was measured using DSC of Seiko Instruments (model DSC-220 cu). Before measurement, about 8~10 mg of each membrane was encapsulated in an aluminum pan in a glove box, thus preparing DSC samples. The heating rate and the cooling rate were fixed to 5° C./min, and Tg could be determined from changes in heat capacity during the second heating process.

Nanostructure of Ionic Liquid-Incorporated PSS-b-PMB Copolymer

As illustrated in FIG. 1a, a block copolymer was poly (styrene-b-methylbutylene) (PSS-b-PMB) having a relatively low molecular weight of 3.5-b-3.1 kg/mol and a sulfonation level of 17 mol % (which means that five styrene units are sulfonated among 30 styrene chains, and this block copolymer is referred to as $S_{30}MB_{44}$ (17) where the subscripts indicate the degree of polymerization of each block). The anion was bis(trifluoromethane) sulfonamide ([HTFSI]). As shown in FIG. 1g, TFSI ions play a role in decreasing the Tg of the membranes.

Five heterocyclic diazoles were imidazole (b. [Im]), pyrazole (c. [Py]), 1-methylimidazole (d. [1-MIm]), 2-methylimidazole (e. [2-MIm]), and 2-ethyl-4-methylimidazole (f. [2-E-4-MIm]) (FIGS. 1b to 1f).

The molecular properties of individual heterocyclic diazoles and HTFSI are summarized in Table 1 below.

TABLE 1

| Materials Used | Molecular Weight (g/mol) | Melting Temperature ($T_m$, ° C.) [a] | pKa | van der Waals Volume ($A^3$) [b] |
|---|---|---|---|---|
| Imidazole [Im] | 68.1 | 90 | 7.0 [c] | 61.6 |
| | | | | 58.6 (cation) |
| Pyrazole [Py] | 68.1 | 68 | 2.5 [d] | 61.4 |
| | | | | 63.6 (cation) |
| 1-methylimidazole [1-MIm] | 82.1 | −6 | 7.2 [c] | 78.9 |
| | | | | 77.4 (cation) |
| 2-methylimidazole [2-MIm] | 82.1 | 142 | 7.9 [c] | 78.2 |
| | | | | 75.6 (cation) |
| 2-ethyl-4-methylimidazole [2-E-4-MIm] | 110.2 | 54 | 8.7 [c] | 111.9 |
| | | | | 109.2 (cation) |
| Bis(trifluoromethane) sulfonimide [HTFSI] | 281.2 | 60 | −10 [e] | 159.2 |

[a] measured using DSC
[b] calculated using ChemAxon's Calculator Plugins
[c] ref 42.,
[d] ref 43.,
[e] ref 44.

The nanostructures of the ionic liquid-incorporated $S_{30}MB_{44}$ (17) copolymers were observed by SAXS and TEM. FIG. 2 illustrates the room-temperature SAXS data of the nanostructures of the membranes impregnated with two ionic liquids with ring structures having unsubstituted diazoles, namely, [Im][HTFSI] and [Py][HTFSI]. On the other hand, ionic liquid-free $S_{30}MB_{44}$ (17) manifested a broad peak at q=0.71 $nm^{-1}$, from which it had no nanostructure.

The [Py][HTFSI]-incorporated membrane showed Bragg peaks (▽) at 1q*: 2q*, indicating the formation of a lamellar (LAM) structure, and the [Im][HTFSI]-incorporated membrane showed Bragg peaks (▼) at 1q*:√3q*:√4q*:√7q*: √9q*, indicating the formation of a hexagonal cylinder (HEX) structure. The disorder, LAM, and HEX structures of the samples were confirmed by cross-sectional TEM images (the right images of FIG. 2).

Also, phase behavior was analyzed in [Im][HTFSI]- and [Py][HTFSI]-incorporated $S_{30}MB_{44}$ (17) copolymers. $S_{30}MB_{44}$ (17) copolymers impregnated with various diazoles exhibited phase behavior in which the nanostructures thereof vary depending on the temperature.

FIG. 4 illustrates the order-order transition of the ionic liquid-incorporated $S_{30}MB_{44}$ (17) depending on changes in the temperature. As illustrated in this drawing, the [2-E-4-MIm] [HTFSI]-incorporated $S_{30}MB_{44}$ (17) copolymer showed SAXS Bragg peaks (↓) at 1q*:√3q*:√4q*(q*=2π/$d_{100}$, domain size $d_{100}$=11.2 nm), indicative of the HEX structure at low temperature (60° C.). When the temperature was raised to 90° C., Bragg peaks (block arrow) were observed at √6q*, √8q*, √14q*, √16q*, √20q*, √22q*, √24q*, and √26q*(q*=2π/$d_{211}$ with $d_{211}$=10.4 nm), so that phase transition was observed from a HEX structure to a gyroid structure. The Miller index values corresponding to the Bragg peaks were (211), (220), (321), (400), (420), (332), (422), and (431), which indicates Ia3d space-group symmetry. Only the gyroid structure was present while the HEX structure disappeared at 100° C., and thermal stability was maintained up to 180° C. When the temperature was cooled to 60° C. from 180° C., the Bragg peaks indicating the HEX structure were observed again (the dashed lines of FIG. 4), verifying the thermoreversible OOT between HEX and gyroid structures. The OOT temperature was 90±5° C.

Phase Diagram of Heterocyclic Diazole-Based Ionic Liquid-Incorporated PSS-b-PMB Copolymer When adding five different heterocyclic diazoles, for example, [Im][HTFSI], [Py][HTFSI], [1-MIm][HTFSI], [2-MIm][HTFSI], and [2-E-4-MIm][HTFSI], the resulting morphological phase diagrams are illustrated in FIG. 5. The alphabet letters D, L, H, and G respectively designate a disorder structure, a LAM structure, a HEX structure, and a gyroid structure. The horizontal dashed lines in the phase diagrams show the phase boundaries for the order-order and the order-disorder transition, and the black regions indicate coexistence of two phases upon undergoing OOT. All nanostructures denoted on the phase diagrams are thermally stable in the temperature range of 25~190° C., and also exhibit thermal reproducibility that enables reappearance of the structures before changes in the temperature during heating and cooling cycles.

As illustrated in FIG. 5, the neat $S_{30}MB_{44}$ (17) copolymer having no ionic liquid shows the disordered morphology in the overall temperature range. On the other hand, the addition of ionic liquids into the $S_{30}MB_{44}$ (17) copolymer results in diversely ordered structures. As such, a wide variety of ordered structures are obtained using different diazoles under the condition that the anion is fixed to [TFSI⁻]. For example, the membranes comprising [Py] and [2-MIm] shows an ODT phenomenon in which a LAM structure appears at room temperature but disappears at about 135° C. with an increase in the temperature. In contrast, [Im] and [1-MIm] having ring structures different from [Py] and [2-MIm] possess a HEX structure at room temperature.

Although not theoretically limited, depending on the diazole ring structure of the ionic liquid incorporated in the $S_{30}MB_{44}$(17) copolymer, the degree of ionic association in the membrane varies, which affects the formation of the nanostructure and the thermodynamic properties.

For the [Im][HTFSI]-incorporated $S_{30}MB_{44}$ (17) copolymer, only a HEX structure appears at low temperature, but coexistence of HEX and LAM structures is observed with an increase in the temperature. When the temperature is 170° C. or more, the HEX structure disappears and only the LAM structure is observed. It is noted that the structure of a single polymer electrolyte membrane varies depending on changes in the temperature, and different nanostructures coexist, which is observed in the quite wide range of 80~160° C. On the other hand, the HEX structure at room temperature of the [1-MIm][HTFSI]-incorporated membrane was maintained up to 190° C., without the phase behavior of OOT or ODT. This is considered to be because [1-MIm][HTFSI] is configured such that a methyl substituent (alkyl-substitution) is attached to one protic site of [Im] to thus form a highly segregated HEX structure, compared to [Im] having no alkyl substituent.

In $S_{30}MB_{44}$ (17) copolymers comprising [2-E-4-MIm] [HTFSI] with two alkyl substituents such as methyl and ethyl at positions other than the protic site of [Im], a HEX structure is showed at room temperature, unlike a LAM structure of the [2-MIm]-incorporated membrane at room temperature. The van der Waals volume of [2-E-4-MIm] is remarkably large compared to [2-MIm], and thus sufficient expansion may occur in the SS conducting domain, resulting in a HEX structure having an expanded volume compared to a LAM structure. When the temperature is raised, phase behavior from the HEX structure to the gyroid structure, namely, OOT, takes place. As such, the temperature at which the structural change is caused is 90±5° C.

The phase diagrams of FIG. 5 illustrate great thermodynamic changes caused by impregnating the $S_{30}MB_{44}$ (17) copolymer with heterocyclic diazole-based ionic liquids. In particular, the kind of heterocyclic diazole is regarded as important when determining the nanostructure of each membrane.

Conductivity of Ionic Liquid-Incorporated $S_{30}MB_{44}$ (17) Copolymer

In order to evaluate factors associated with ion transport behavior, the conductivity of ionic liquid-incorporated PEMs was measured. The amount of heterocyclic diazole-based ionic liquid in the $S_{30}MB_{44}$ (17) copolymer was determined to be equimolar to that of the sulfonic acid [—$SO_3H$] group, and was set to about 30 wt %. Using an electrode cell directly made in lab, the trough-plane conductivity of each membrane was measured.

FIG. 6 illustrates the conductivity of $S_{30}MB_{44}$ (17) copolymers depending on the kind of added ionic liquid. Compared to the other ionic liquid-incorporated membranes, the [2-MIm][HTFSI]-incorporated membrane exhibited high conductivity at high temperature. On the other hand, the [Py][HTFSI]-incorporated membrane manifested the lowest conductivity as shown in the left lower graph of FIG. 5a. In particular, the conductivity of this membrane having a very high Tg of about 120° C. could not be measured at low temperature, but could be measured only at high temperature of 140° C. or more.

FIG. 7 illustrates the ion transport mechanisms of the ionic liquid-incorporated $S_{30}MB_{44}$ (17) copolymers on the basis of the measurement results as above, as proposed by the present inventors.

The invention claimed is:

1. A polymer electrolyte membrane comprising an ionic liquid based on an imidazole compound represented by Chemical Formula (1) below:

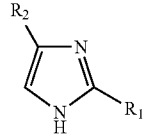

Chemical Formula (1)

wherein R1 is C1-C8 alkyl, and R2 is hydrogen or C1-C8 alkyl, wherein the compound is 2-methylimidazole, and an anion comprising bis(trifluoromethane)sulfonimide (HTFSI).

2. The polymer electrolyte membrane of claim 1, wherein the polymer is a sulfonated polymer.

3. The polymer electrolyte membrane of claim 2, wherein the polymer is a block copolymer including a styrene block, at least a portion of which is sulfonated.

4. The polymer electrolyte membrane of claim 1, wherein the polymer is a block copolymer including a styrene repeating unit and an alkylene repeating unit.

5. The polymer electrolyte membrane of claim 1, wherein the polymer has a gyroid structure.

6. An actuator, a lithium battery, or a fuel cell, comprising the polymer electrolyte membrane of claim 1.

* * * * *